(12) United States Patent
Jonas

(10) Patent No.: US 7,956,271 B1
(45) Date of Patent: Jun. 7, 2011

(54) MUSICAL RHYTHMIC TEACHING BLOCK SYSTEM

(76) Inventor: Alicia Jonas, New York, NY (US)

(*) Notice: Subject to any disclaimer, the term of this patent is extended or adjusted under 35 U.S.C. 154(b) by 0 days.

(21) Appl. No.: 12/249,912

(22) Filed: Oct. 11, 2008

(51) Int. Cl.
*G09B 15/02* (2006.01)
(52) U.S. Cl. .......................................... 84/476; 84/483.2
(58) Field of Classification Search ............... 84/476, 84/483.2
See application file for complete search history.

(56) References Cited

U.S. PATENT DOCUMENTS

| | | | | |
|---|---|---|---|---|
| 5,275,567 A * | 1/1994 | Whitfield | ...................... | 434/113 |
| 6,175,069 B1 * | 1/2001 | Longacre | ....................... | 84/476 |
| 6,271,453 B1 * | 8/2001 | Hacker | ............................ | 84/476 |
| 2009/0031880 A1 * | 2/2009 | Chu | ................................ | 84/476 |
| 2009/0142738 A1 * | 6/2009 | Suganuma | .................... | 434/191 |

* cited by examiner

*Primary Examiner* — Jianchun Qin
(74) *Attorney, Agent, or Firm* — Michael I. Kroll

(57) ABSTRACT

A set of music instructional blocks includes a number of blocks having mating magnets on two opposing sides thereof and musical indicia on the four remaining sides. The musical indicia represent standard rhythmic notes, musical rests and time signatures. The blocks having musical indicia representing standard rhythmic notes are sized proportionally to the note represented, with the quarter note being the primary sized block. For instructional practice, the blocks can be connected together by the magnets to form musical sequences.

11 Claims, 18 Drawing Sheets

US 7,956,271 B1

MUSICAL RHYTHMIC TEACHING BLOCK SYSTEM

BACKGROUND OF THE INVENTION

1. Field of the Invention

The present invention relates generally to teaching music and, more specifically, to a set of magnetically attached blocks having indicia for standard rhythmic notes and rest values imbued thereupon so that a user may place appropriate blocks together to form musical sequences practice educational exercises. On each block two opposing sides are fitted with magnets for connecting to one another, the blocks are either colored black to represent notes or white to represent rests while on the remaining four sides, the primary blocks are based on the quarter note value and its rhythmic equivalent. Other blocks of the present invention make up a full set, representative of values such as eighth notes, sixteenth notes and their equivalents, while also varying in size, matching their rhythmic proportion to said primary blocks. Typically a complete set of the present invention consists of 50 blocks that can all be connected to one another magnetically.

2. Description of the Prior Art

There are other block devices designed for teaching music and rhythm. While these musical education devices may be suitable for the purposes for which they were designed, they would not be as suitable for the purposes of the present invention, as hereinafter described.

SUMMARY OF THE PRESENT INVENTION

A primary object of the present invention is to provide a set of magnetic block having musical indicia for use in teaching the rhythmic system of music.

Another object of the present invention is to provide a set of magnetic blocks having two opposed sides that contain magnets for inter connection to one another.

Yet another object of the present invention is to provide a set of magnetic blocks having four of its sides forming a primary block having indicia relative to the value of a quarter notes and its rhythmic equivalent.

Still yet another object of the present invention is to provide a set of magnetic blocks having coloration of either black or white with said black blocks representing notes while the white blocks are representative of rests.

Another object of the present invention is to provide a set of magnetic blocks representing other rhythmic values such as eighth or sixteenth notes and their rhythmic equivalent and having a size representative of said values.

Yet another object of the present invention is to provide a set of magnetic blocks that can be easily utilized to put together and teach rhythmic patterns, time signatures to an individual utilizing said blocks as an instructional tool.

Additional objects of the present invention will appear as the description proceeds.

The present invention overcomes the shortcomings of the prior art by providing a set of magnetic blocks having magnets on opposing side with the remaining sides having indicia representative of different musical symbols and rhythmic indicia that may be utilized in educating an individual in music's rhythmic system. Additionally the present invention has primary blocks representative of quarter notes and additional other blocks representative of other notes such as eighth and sixteenth notes and their rhythmic equivalent. Finally color and size of said block are variable and are colored either black for notes or white for rests.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
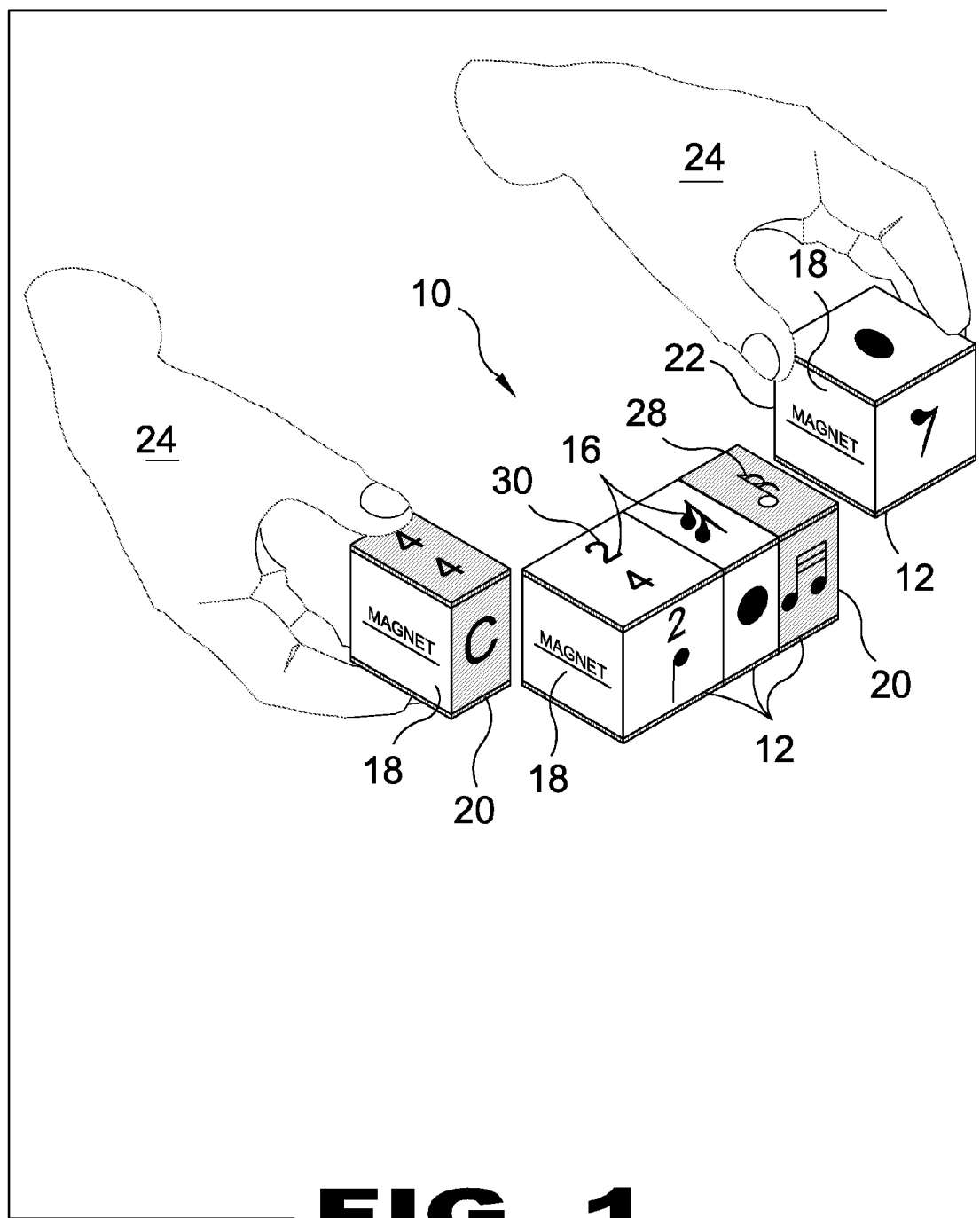
FIG. 1 is an illustrative view of the present invention.

Turning now descriptively to the drawings, in which similar reference characters denote similar elements throughout the several views, the figures illustrate the Musical Rhythmic Teaching Blocks of the present invention. With regard to the reference numerals used, the following numbering is used throughout the various drawing figures.

10 Musical Rhythmic Teaching Blocks of the present invention
12 music block
14 primary block
16 musical indicia
18 magnet
20 gray block
22 white block
24 side of 12
26 time signature block
27 musical note block
28 musical note
30 time signature/rest
32 eighth note
34 sixteenth note
36 quarter note
38 rhythmic value related to the music blocks

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10. The present invention is a musical rhythmic system of music blocks 12 that are designed to aid students to understand the rhythmic system. The primary blocks 14 are based on a value of a quarter notes 36 including eighth notes 32 and sixteenth notes 34. Each primary block has four sides containing musical indicia 16 symbolizing a quarter note and its rhythmic equivalent. Other blocks 12, making up a full set, have musical indicia 16 representing other rhythmic values like eighth notes, sixteenth notes and their rhythmic equivalent. These blocks 12 vary in size, matching their rhythmic value and always in proportion to the primary block. Blocks 12 are represented in two colors, grey 20 and white 22, imitating the piano keyboard. Grey blocks 20 represent value of the notes 28 while white blocks 22 represent value of rests. Other blocks 12 represent time signatures 30. All blocks can be connected together by the user 24 with magnets 18 to create a musical line or phrase. A complete set consists of fifty blocks.

Figure 2:
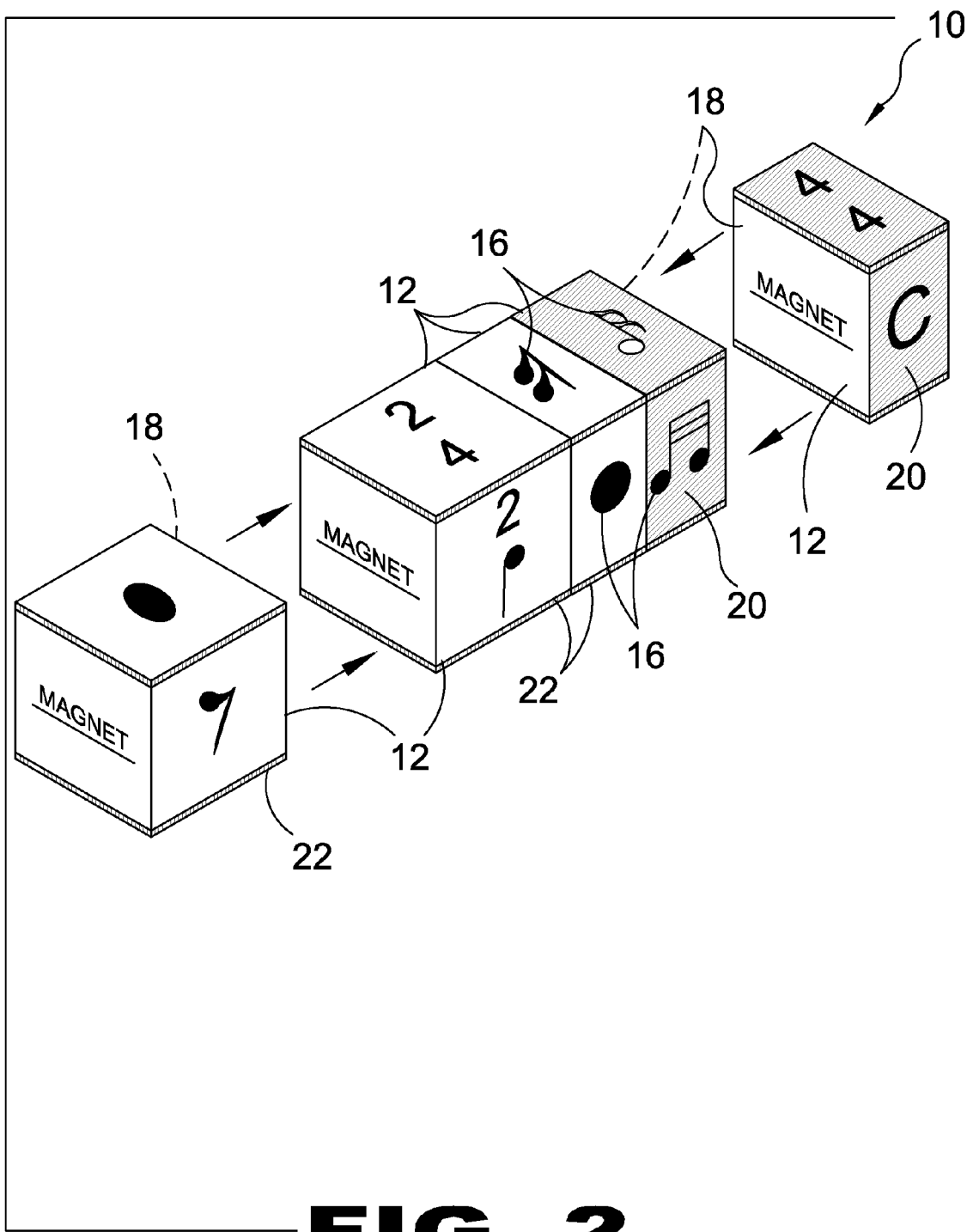
FIG. 2 is a perspective view of the present invention.

FIG. 2 is a perspective view of the present invention 10. The present invention is a musical rhythmic system of music blocks 12 that are designed to aid students to understand the rhythmic system. The primary blocks are based on a value of a quarter notes. Each primary block has four sides containing musical indicia 16 symbolizing a quarter note and its rhythmic equivalent. Other blocks 12, making up a full set, have musical indicia 16 representing other rhythmic values like eighth notes, sixteenth notes and their rhythmic equivalent. These blocks 12 vary in size, matching their rhythmic value and always in proportion to the primary block. Blocks 12 are represented in two colors, grey 20 and white 22, imitating the piano keyboard. Grey blocks 20 represent value of the notes while white blocks 22 represent value of rests. Other blocks 12 represent time signatures. All blocks can be connected together by magnets 18 to create a musical line or phrase. A complete set consists of fifty blocks.

Figure 3:
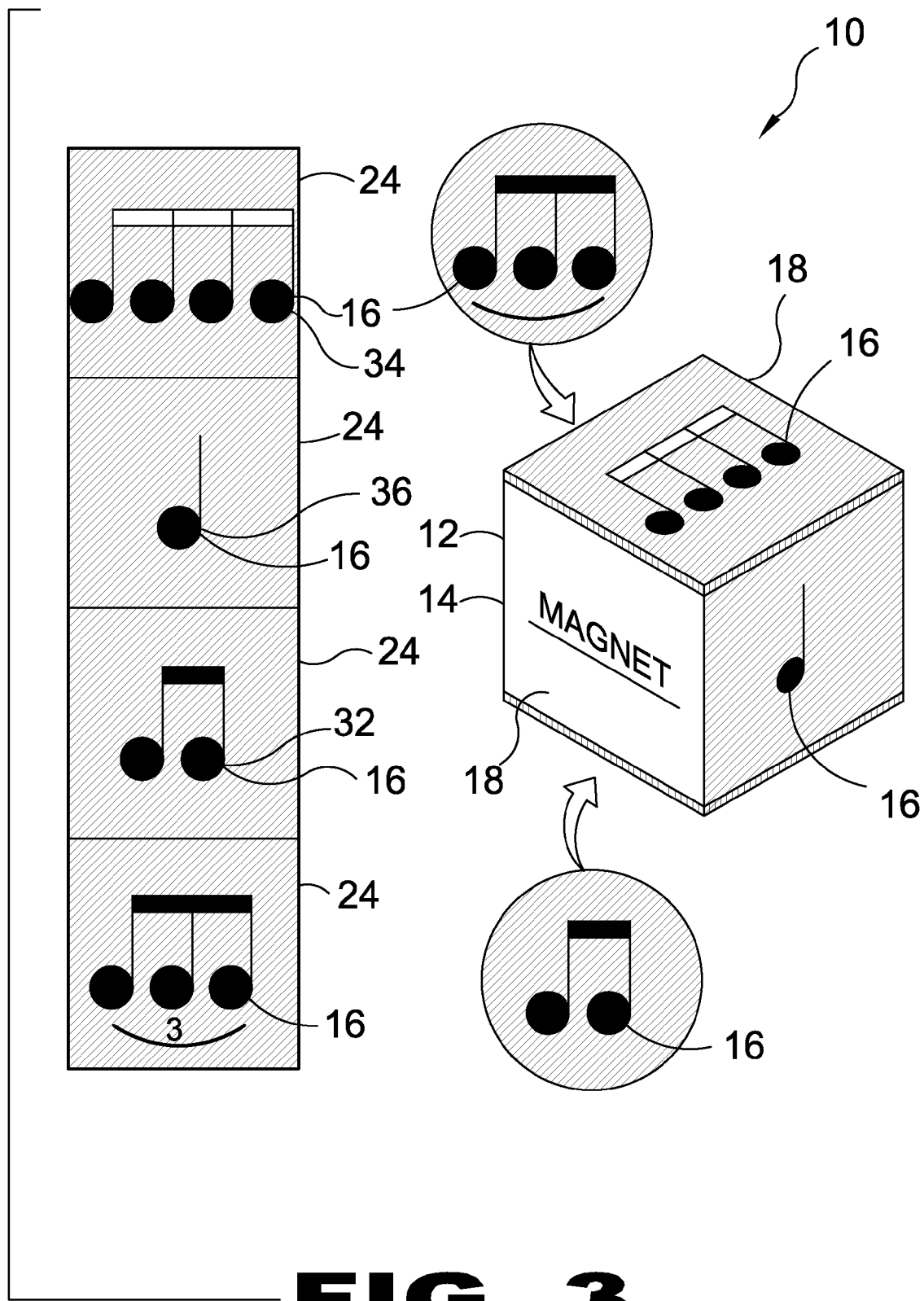
FIG. 3 is a sample of a musical block of the present invention.

FIG. 3 is a sample of a musical block of the present invention 10. Shown are a primary block 14 and the four musical indicia 16 that appear on one of the gray blocks 20. Four sides 24 of the blocks 12 contain musical indicia 16 while the remaining two opposing sides 24 are magnetic 18.

Figure 4:
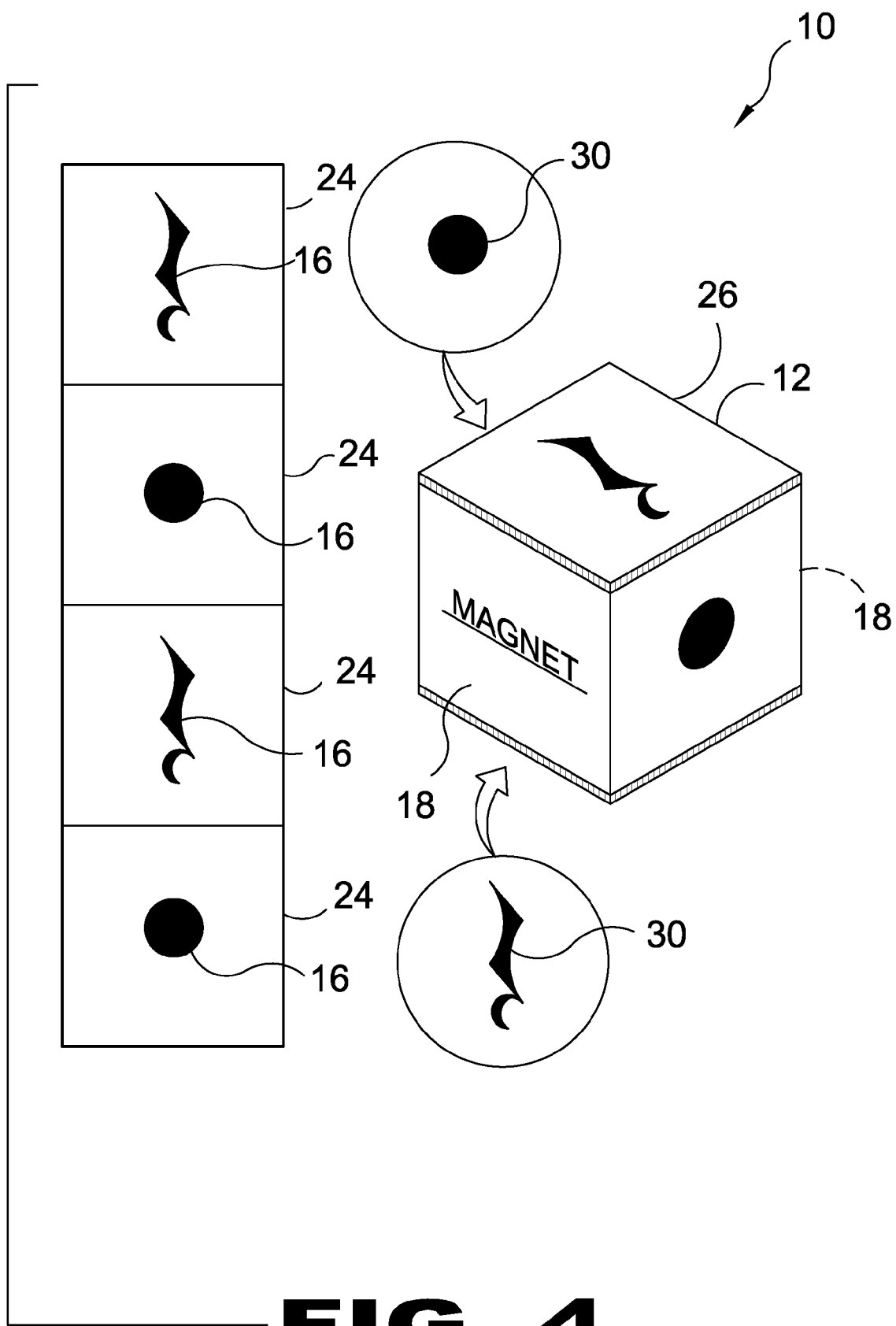
FIG. 4 is a sample of a musical block of the present invention.

FIG. 4 is a sample of a musical block of the present invention 10. Shown are a time signature block 26 and the four musical indicia 16 that appear on one of the white blocks 22. Four sides 24 of the blocks 12 contain time signatures 30 while the remaining two opposing sides 24 are magnetic 18.

Figure 5:
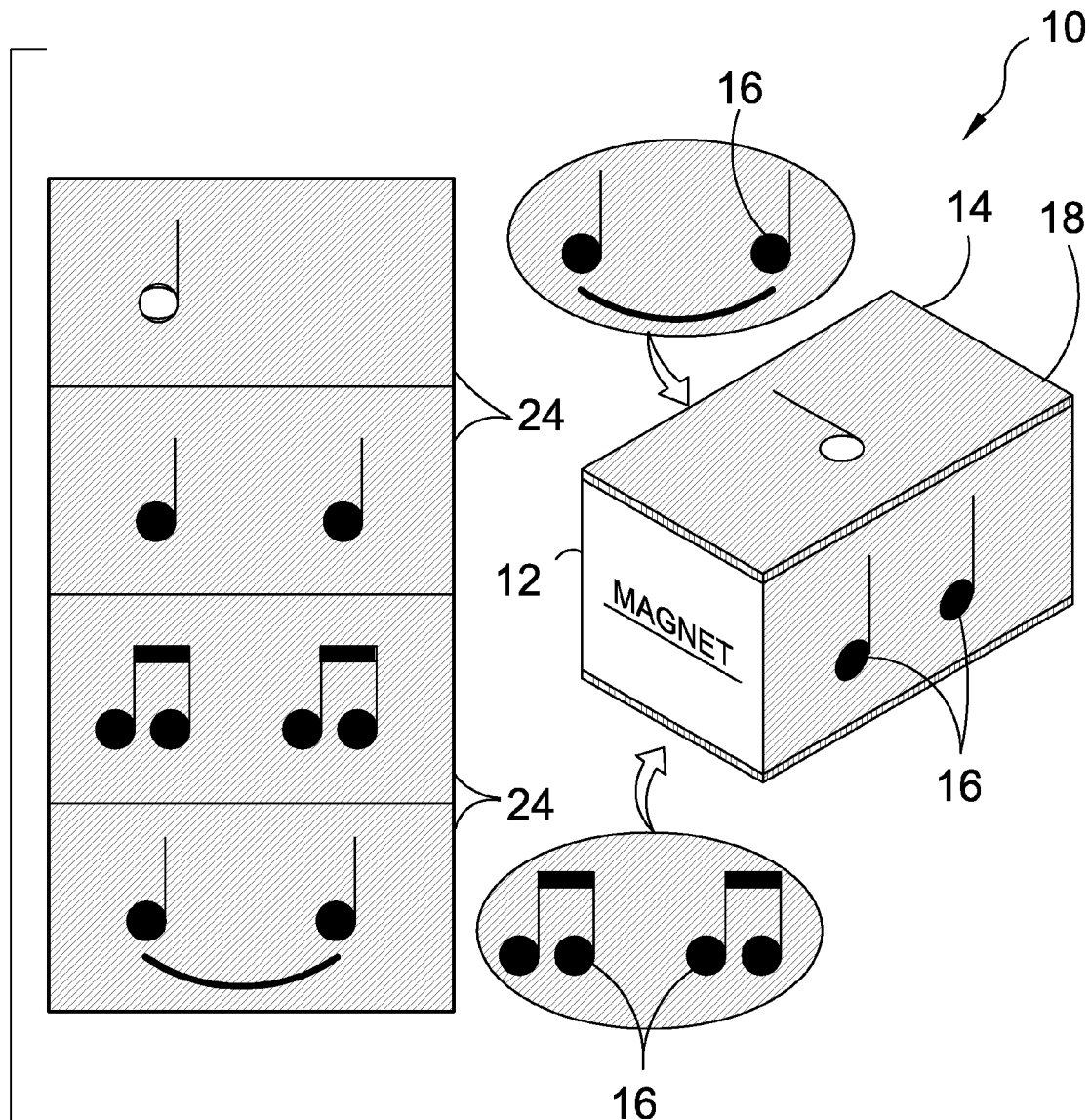
FIG. 5 is a sample of a musical block of the present invention.

FIG. 5 is a sample of a musical block of the present invention 10. Shown are a primary block 14 and the four musical indicia 16 that appear on one of the gray blocks 20. Four sides 24 of the blocks 12 contain musical indicia 16 while the remaining two opposing sides 24 are magnetic 18.

Figure 6:
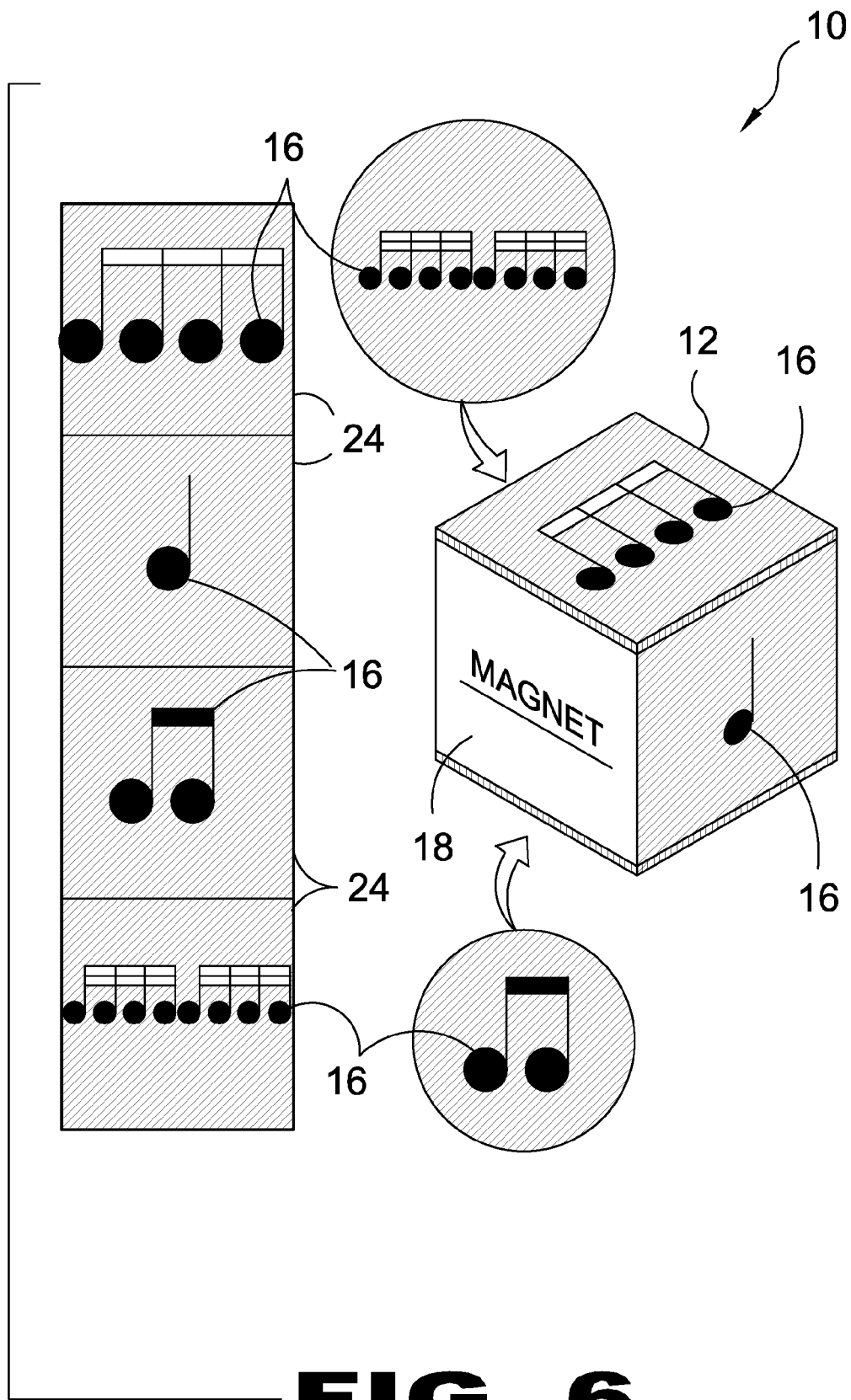
FIG. 6 is a sample of a musical block of the present invention.

FIG. 6 is a sample of a musical block of the present invention 10. Shown are a block 12 and the four musical indicia 16 that appear on one of the gray blocks 20. Four sides 24 of the blocks 12 contain musical indicia 16 while the remaining two opposing sides 24 are magnetic 18.

Figure 7:
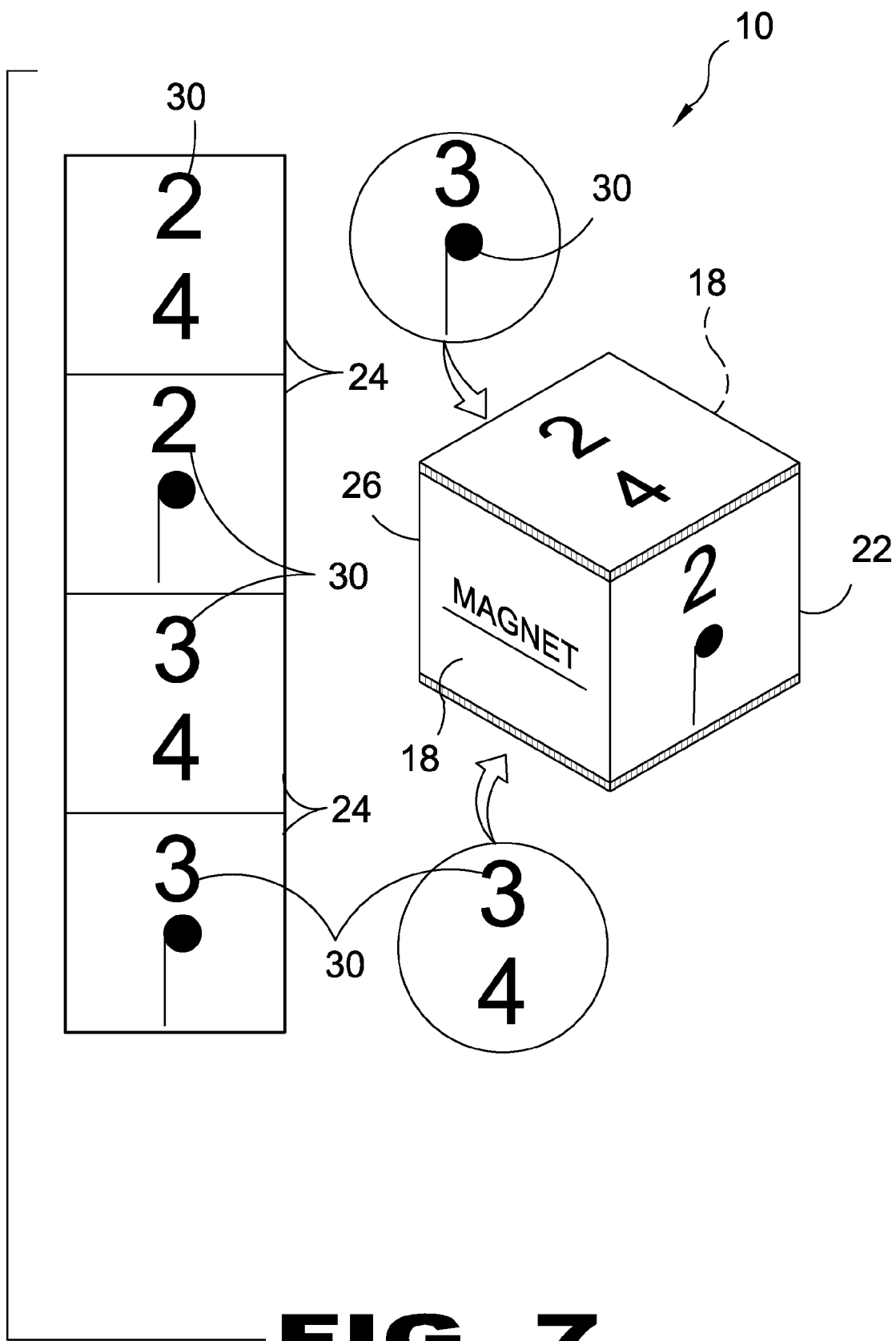
FIG. 7 is a sample of a musical block of the present invention.

FIG. 7 is a sample of a musical block of the present invention 10. Shown are a time signature block 26 and the four musical indicia 16 that appear one of the white blocks 22. Four sides 24 of the time signature block 26 contains musical indicia 16 in the form of time signatures 30 while the remaining two opposing sides 24 are magnetic 18.

Figure 8:
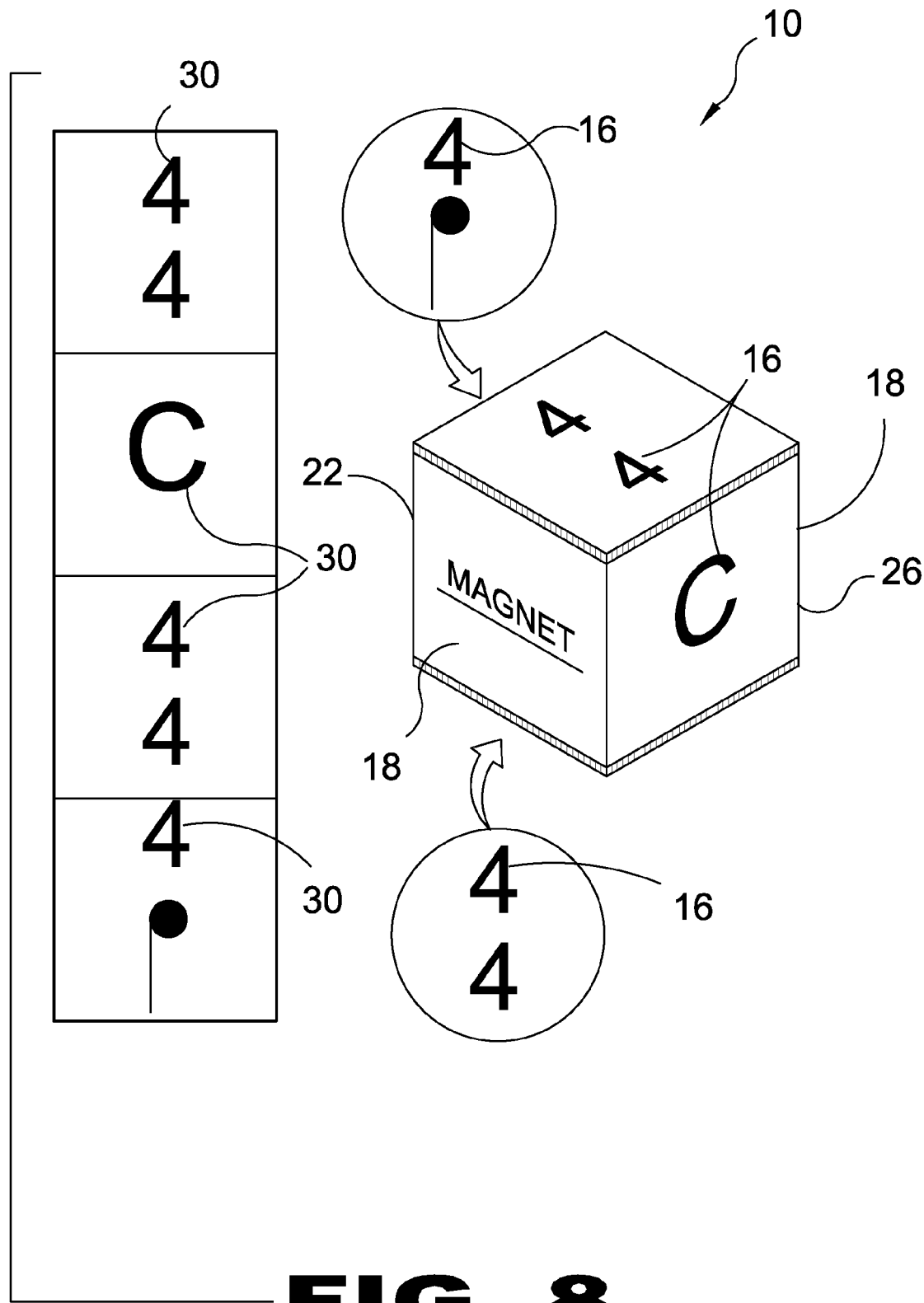
FIG. 8 is a sample of a musical block of the present invention.

FIG. 8 is a sample of a musical block of the present invention 10. Shown are a time signature block 26 and the four musical indicia 16 that appear on one of the white blocks 22. Four sides of the time signature block 26 contains musical indicia 16 in the form of time signatures 30 while the remaining two opposing sides are magnetic 18.

Figure 9:
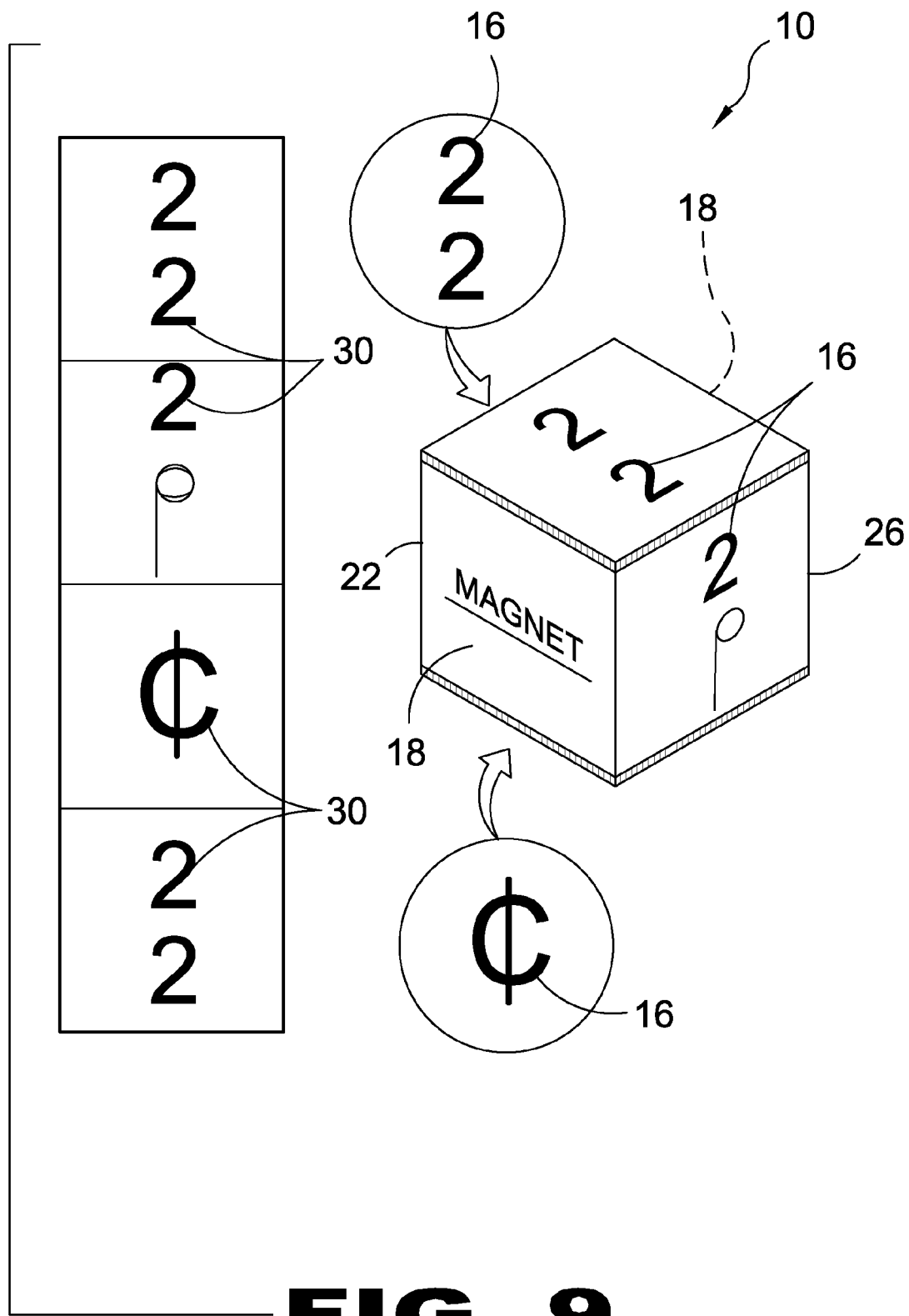
FIG. 9 is a sample of a musical block of the present invention.

FIG. 9 is a sample of a musical block of the present invention 10. Shown are a time signature block 26 and the four musical indicia 16 that appear one of the white blocks 22. Four sides of the time signature block 26 contains musical indicia 16 in the form of time signatures 30 while the remaining two opposing sides are magnetic 18.

Figure 10:
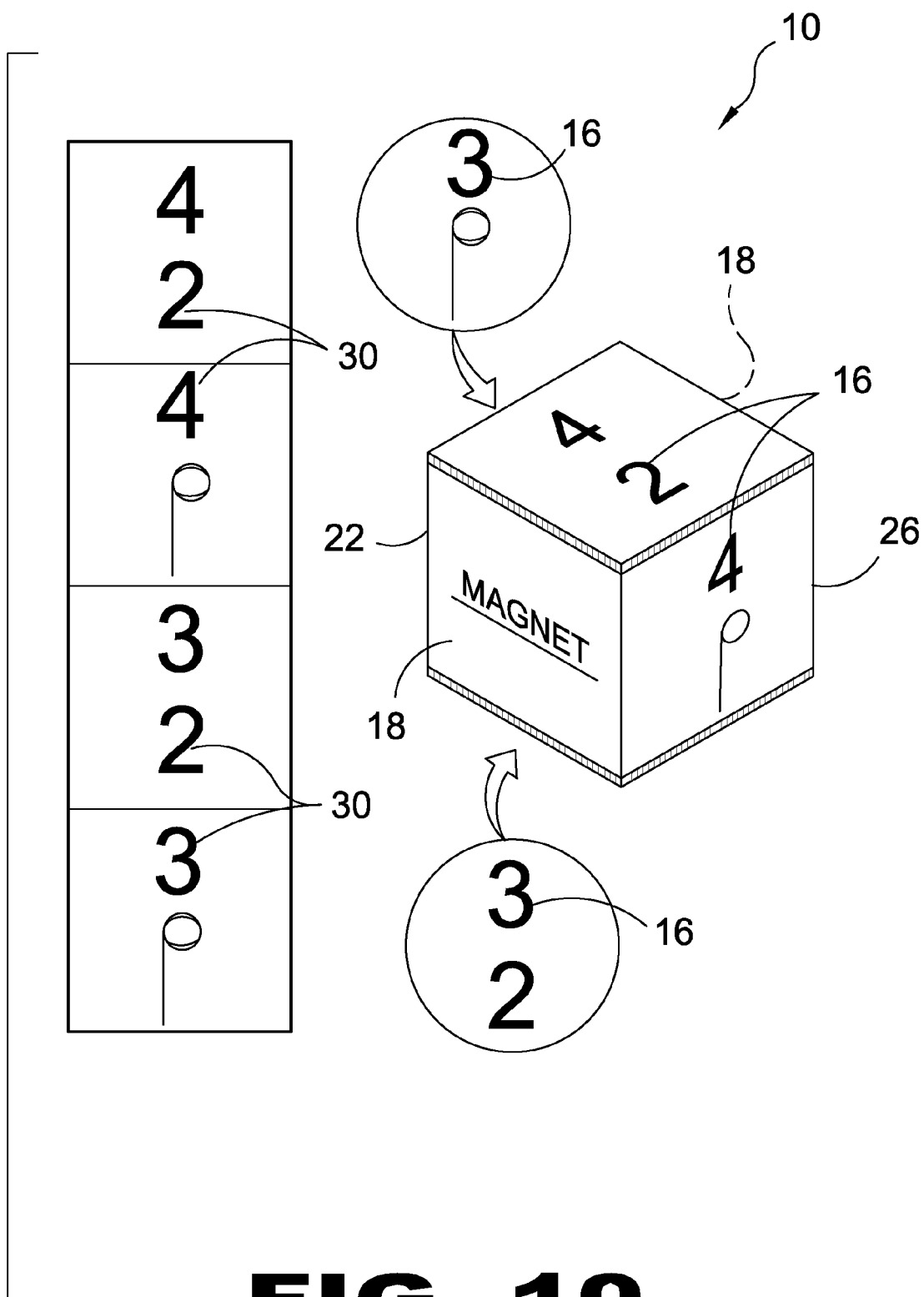
FIG. 10 is a sample of a musical block of the present invention.

FIG. 10 is a sample of a musical block of the present invention 10. Shown are a time signature block 26 and the four musical indicia 16 that appear on one of the white blocks 22. Four sides of the time signature block 26 contains musical indicia 16 in the form of time signatures 30.

Figure 11:
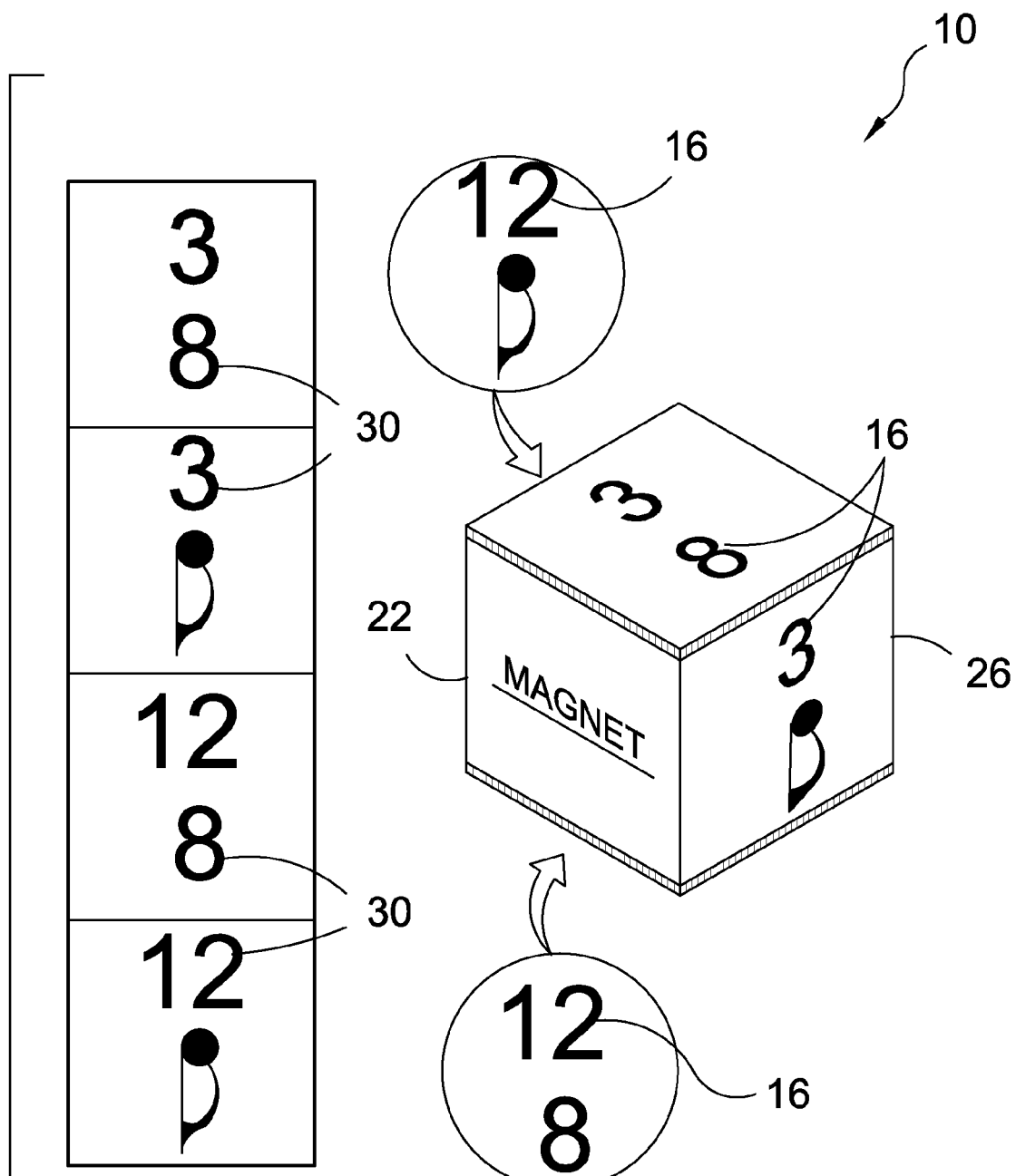
FIG. 11 is a sample of a musical block of the present invention.

FIG. 11 is a sample of a musical block of the present invention 10. Shown are a time signature block 26 and the four musical indicia 16 that appear on one of the white blocks 22. Four sides of the time signature block 26 contains musical indicia 16 in the form of time signatures 30.

Figure 12:
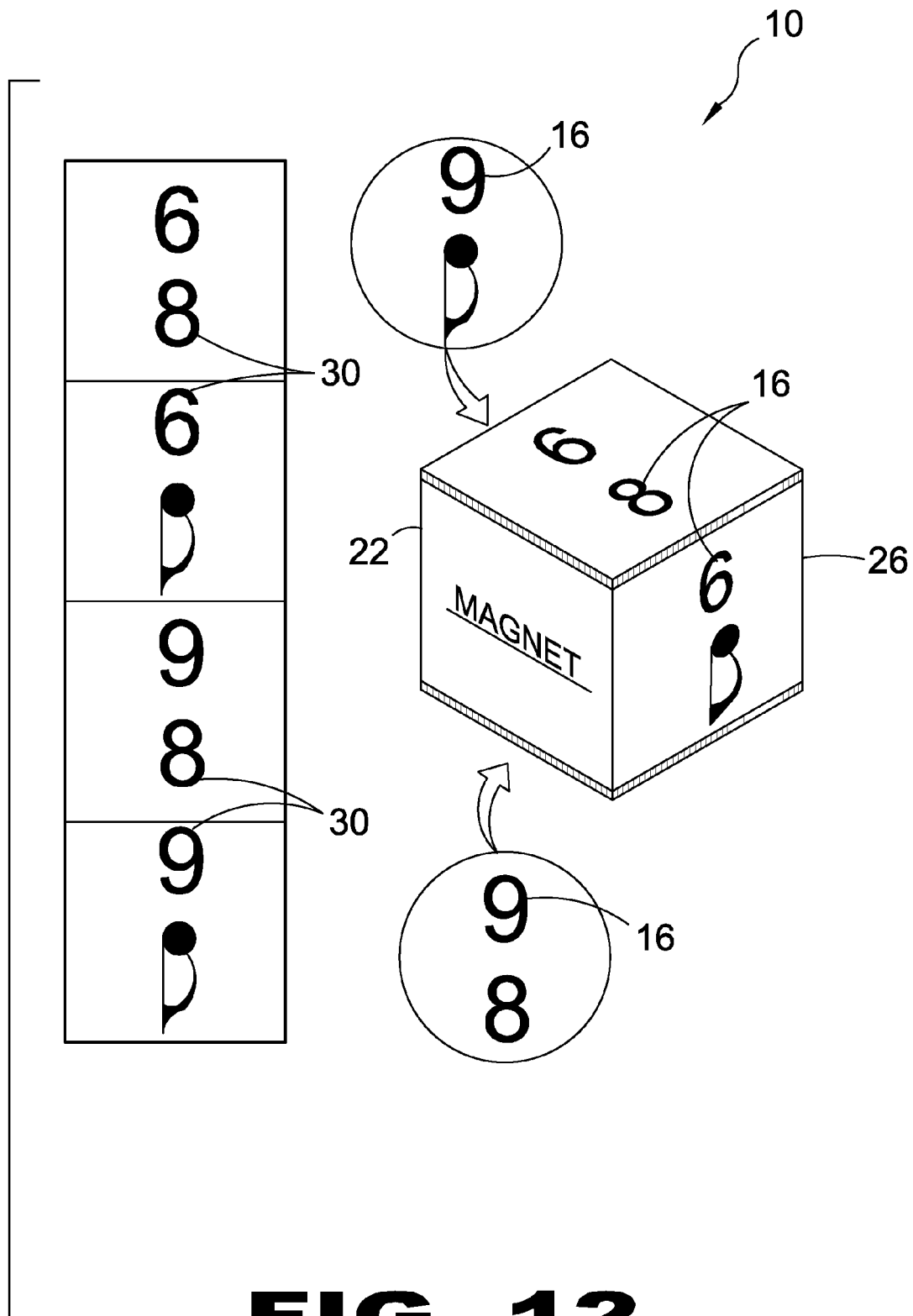
FIG. 12 is a sample of a musical block of the present invention.

FIG. 12 is a sample of a musical block of the present invention 10. Shown are a time signature block 26 and the four musical indicia 16 that appear on one of the white blocks 22. Four sides of the time signature block 26 contain musical indicia 16 in the form of time signatures 30.

Figure 13:
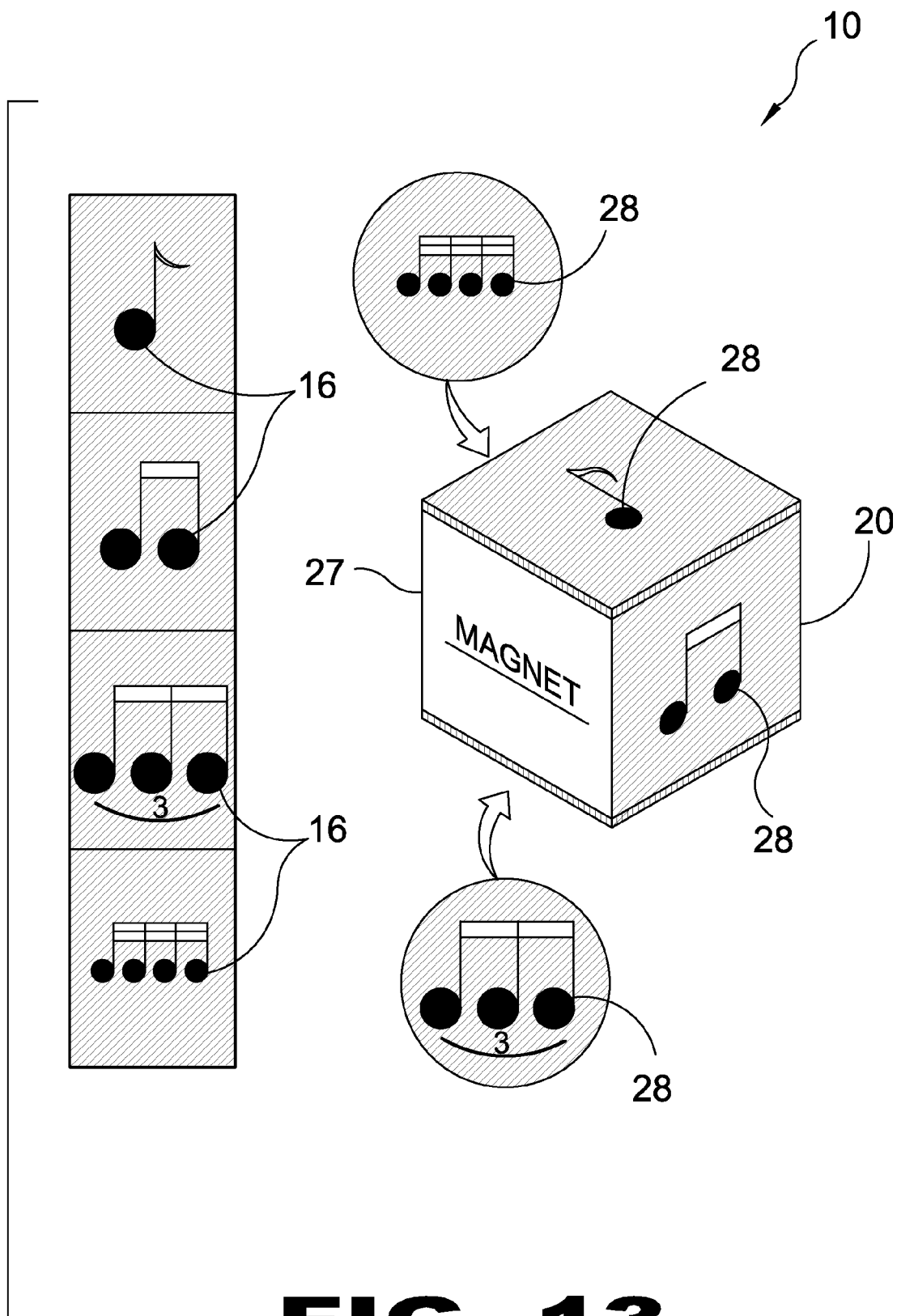
FIG. 13 is a sample of a musical block of the present invention.

FIG. 13 is a sample of a musical note block 27 of the present invention 10. Shown are the musical indicia 16 on the gray block 20 representing musical notes 28.

Figure 14:
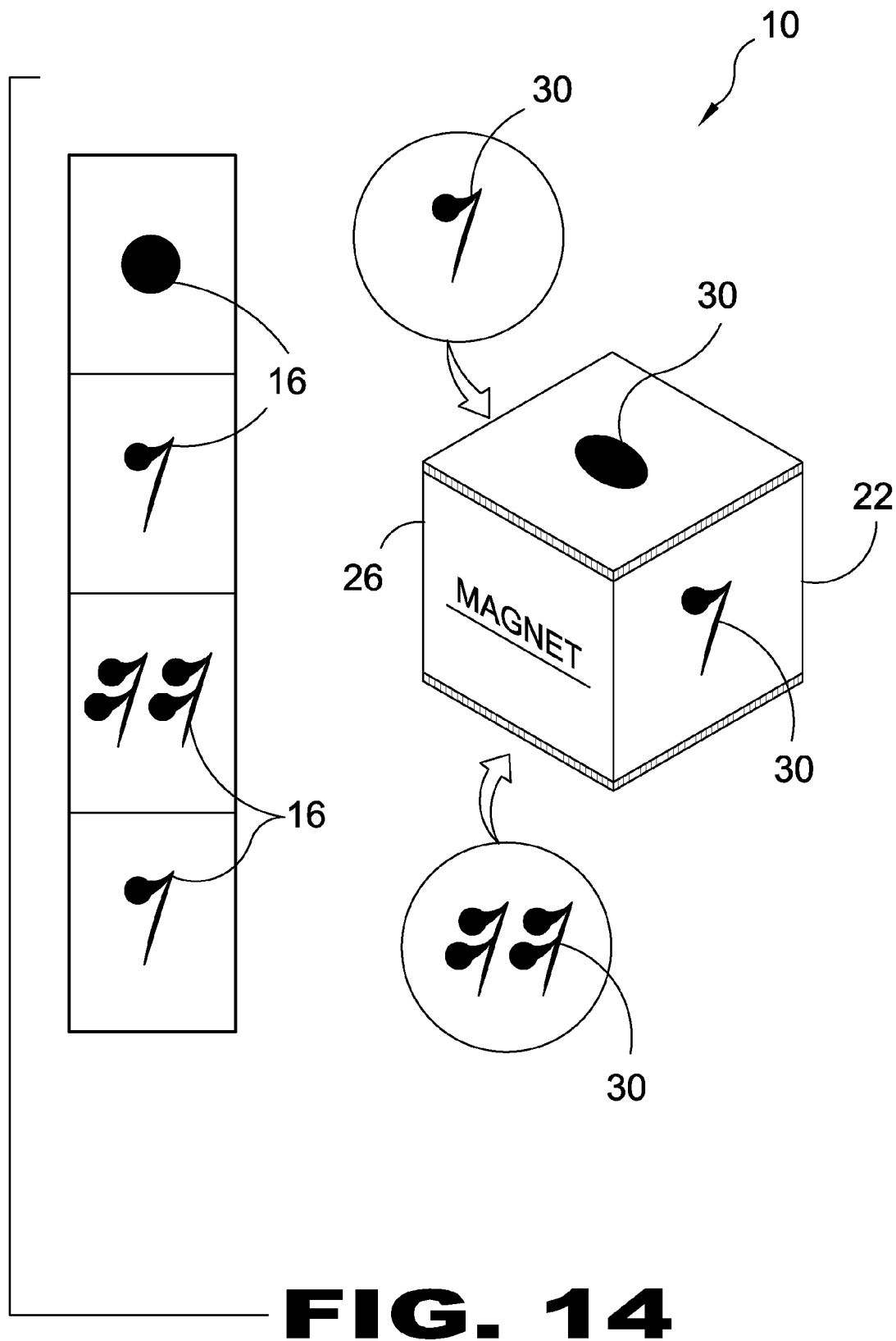
FIG. 14 is a sample of a musical block of the present invention.

FIG. 14 is a sample of a time signature block 26 of the present invention 10. Shown are the musical indicia 16 on the white block 22 representing time signature/rest symbols 30.

Figure 15:
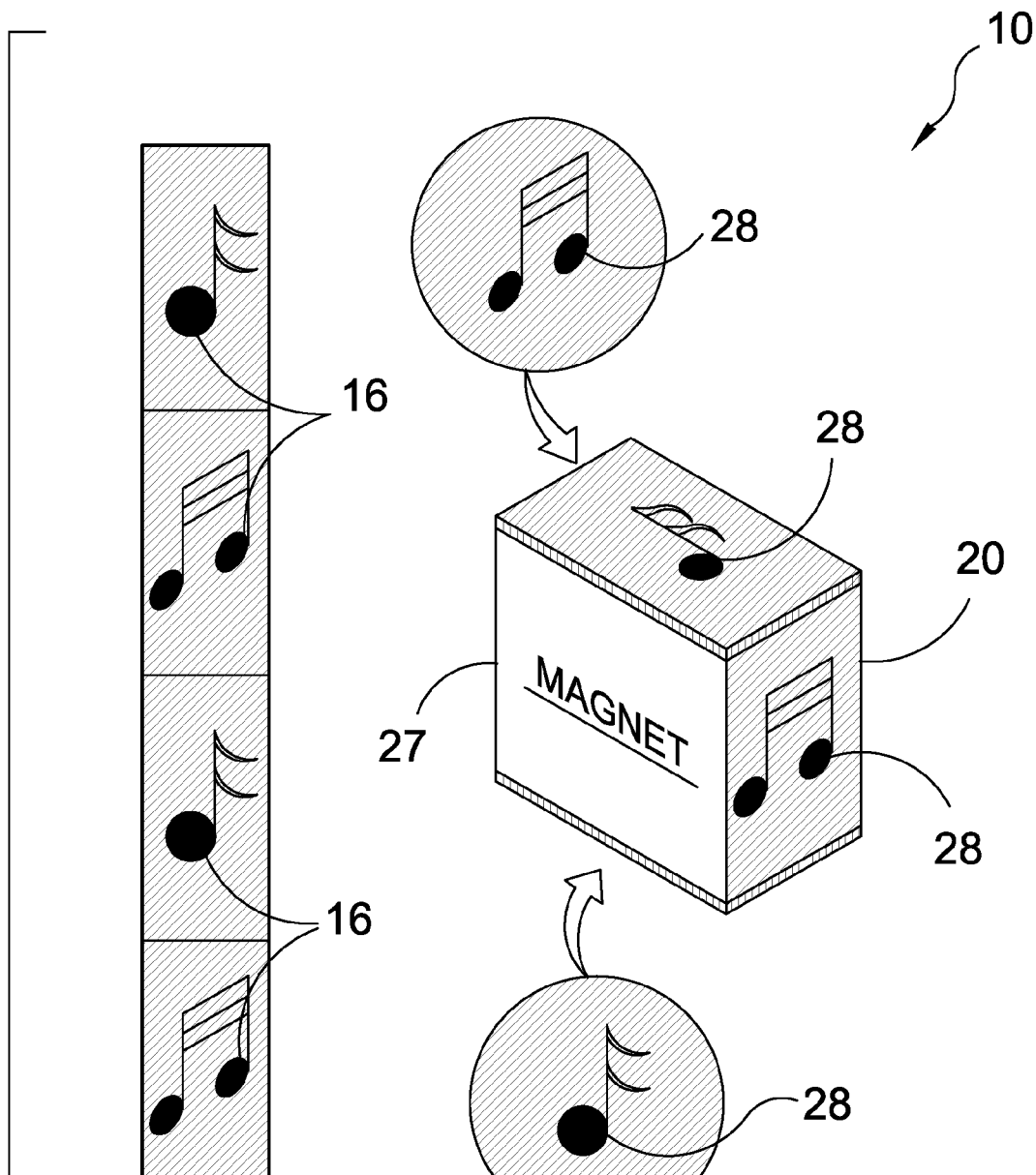
FIG. 15 is a sample of a musical block of the present invention.

FIG. 15 is a sample of a musical note block 27 of the present invention 10. Shown are the musical indicia 16 on the gray block 20 representing musical notes 28.

Figure 16:
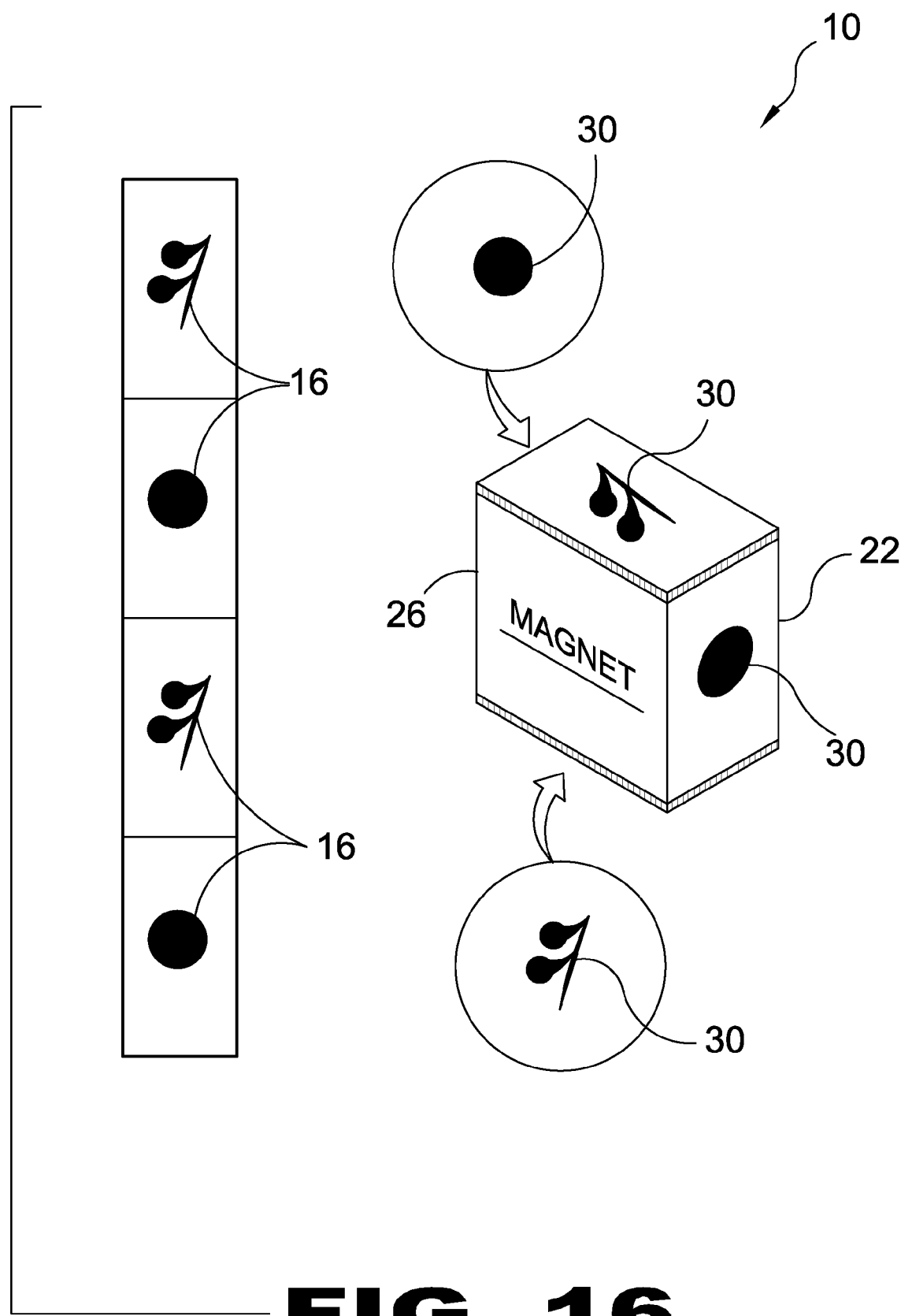
FIG. 16 is a sample of a musical block of the present invention.

FIG. 16 is a sample of a time signature block 26 of the present invention 10. Shown are the musical indicia 16 on the white block 22 representing time signature/rest symbols 30.

Figure 17:
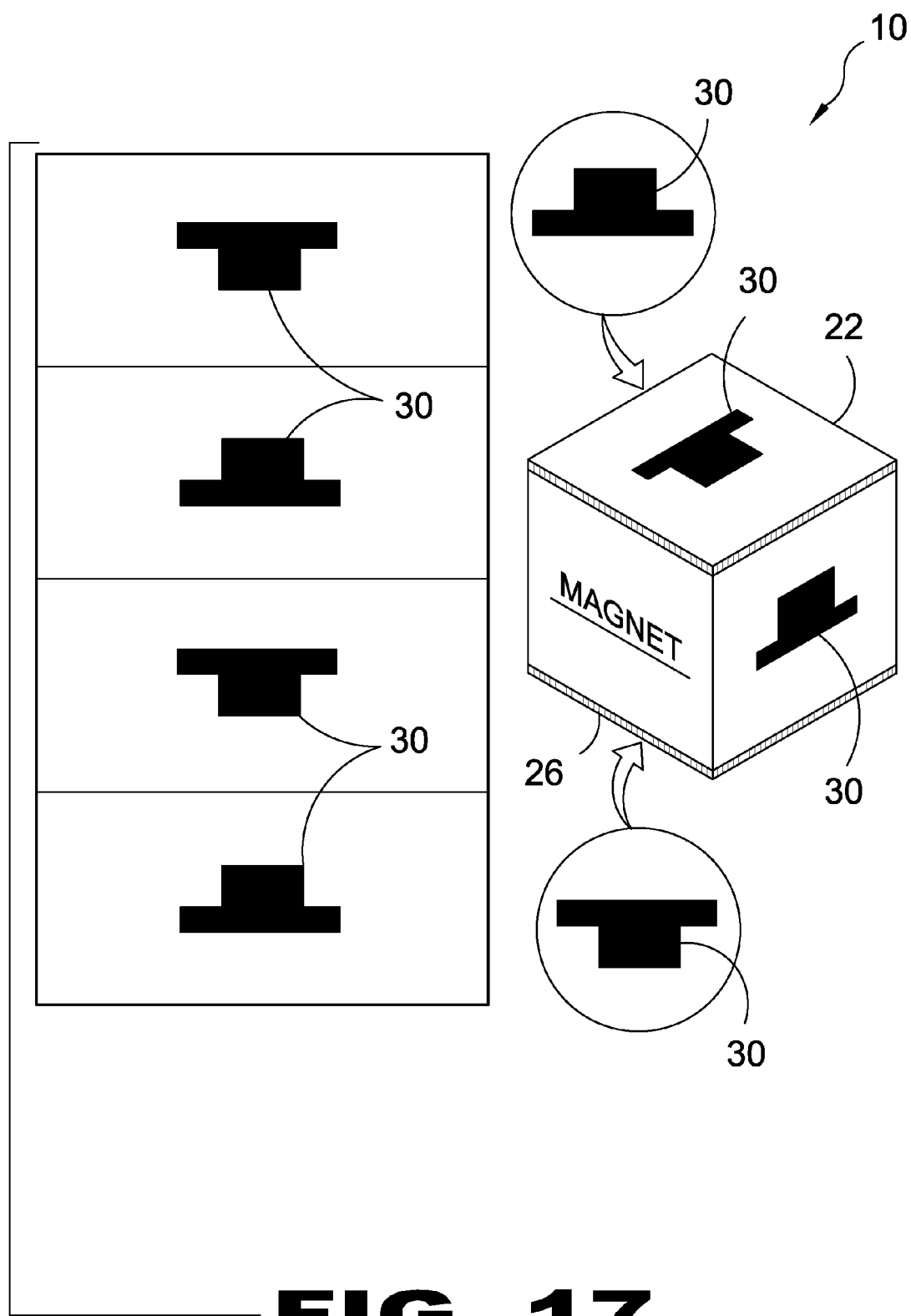
FIG. 17 is a sample of a musical block of the present invention.

FIG. 17 is a sample of a time signature block 26 of the present invention 10. Shown are the musical indicia 16 on the white block 22 representing time signature/rest symbols 30.

Figure 18:
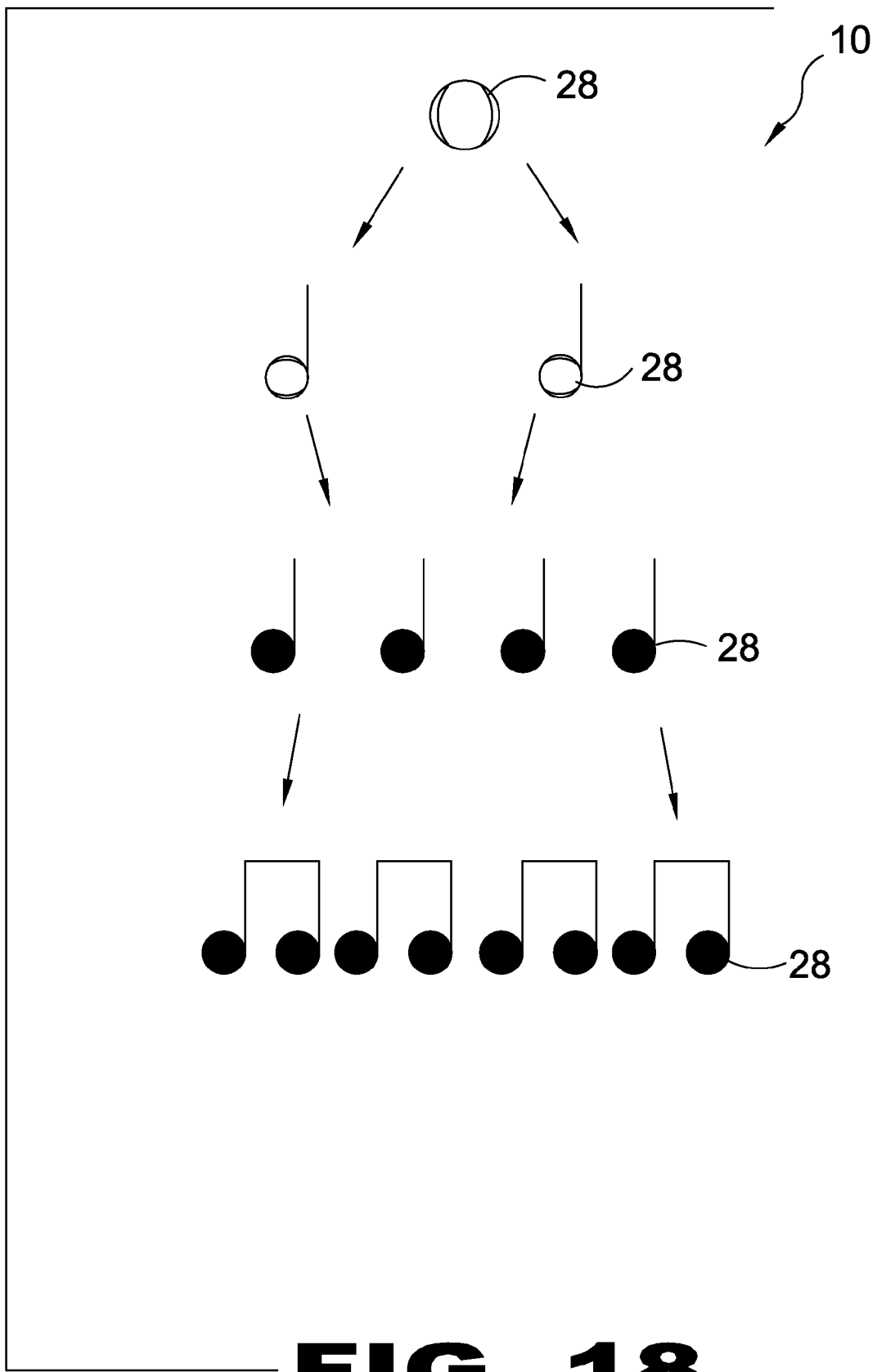
FIG. 18 is a chart of rhythmic values related to the musical blocks of the present invention.

FIG. 18 is a chart of rhythmic values 38 related to the musical blocks of the present invention. Time in music is represented by rhythmic values 38. These note values are related mathematically. The largest musical note 28 in common use today is the whole note. The chart below describes the relationships of the other notes.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A set of music instructional blocks comprising:
   a) a plurality of six-sided blocks, each said block having mating magnets on two opposing sides and musical indicia on the four remaining sides;
   b) at least one of said plurality of blocks having musical indicia representing standard rhythmic notes;
   c) at least one of said plurality of blocks being a primary block having musical indicia representing a quarter note value and its rhythmic equivalent;
   d) at least one of said plurality of blocks having musical indicia representing a note selected from the group of eighth and sixteenth notes and their rhythmic equivalent;
   e) said plurality of blocks including a plurality of first shaped blocks and a plurality of second shape blocks, said first shaped blocks having two opposing square sides without indicia and four square indicia bearing sides, the indicia on a respective indicia bearing side of any first shape block being different than the indicia on the remaining indicia bearing sides of the same block, said magnets disposed in said first shape blocks in the opposing sides without indicia, said second shape blocks having two opposing square sides without indicia and four rectangular indicia bearing sides, the indicia on a respective indicia bearing side of any second shape block being different than the indicia on the remaining indicia bearing sides of the same block, said magnets disposed in said second shaped blocks in the opposing sides without indicia, said second shape blocks having first and second orientations, wherein the long sides of the first orientation blocks extend vertically and the long sides of the second orientation blocks extend horizontally;
   f) at least one of said plurality of blocks having musical indicia representing a rest value, said musical indicia indicating a rest value being on both said first and second shape blocks, wherein the musical indicia indicating a rest value on said first shape blocks is different than the rest values on said second shaped blocks;
   g) each of said at least one blocks having musical indicia representing standard rhythmic notes is colored gray;
   h) each of said at least one blocks having musical indicia representing a rest value is colored white; and
   i) at least one of said plurality of blocks having musical indicia representing a time signature, said time signature being on both said first and second shape blocks, wherein said time signature on said first shape blocks is different than the time signature on said second shape blocks.

2. A set of music instructional blocks according to claim 1, wherein:
   a) at least one of said plurality of blocks has musical indicia representing an eighth note and its rhythmic equivalent; and
   b) at least one of said plurality of blocks has musical indicia representing a sixteenth note and its rhythmic equivalent.

3. A set of music instructional blocks according to claim 2, wherein said plurality of blocks having musical indicia representing standard rhythmic notes are sized proportionally to the note represented.

4. A set of music instructional blocks according to claim 3, comprising at least about 50 blocks.

5. A set of music instructional blocks according to claim 4, comprising 50 blocks.

6. A set of music instructional blocks according to claim 3, further comprising a set of instructions.

7. A set of music instructional blocks according to claim 6, wherein said set of instructions includes a plurality of practice exercises.

8. A method of teaching the rhythmic system of music comprising the steps:
   a) providing a set of music instructional blocks including
      i) a plurality of six-sided blocks, each said block having mating magnets on two opposing sides and musical indicia on the four remaining sides,
      ii) at least one of said plurality of blocks having musical indicia representing standard rhythmic notes,
      iii) at least one of said plurality of blocks being a primary block having musical indicia representing a quarter note value and its rhythmic equivalent;
      iv) at least one of said plurality of blocks having musical indicia representing a note selected from the group eighth and sixteenth notes and their rhythmic equivalent; and
      v) said plurality of blocks including a plurality of first shaped blocks and a plurality of second shape blocks, said first shaped blocks having two opposing square sides without indicia and four square indicia bearing sides, the indicia on a respective indicia bearing side of an first shape block being different than indicia on the remaining indicia bearing sides of the same block, said magnets disposed in said first shape blocks in the opposing sides without indicia, said second shape blocks having two opposing ware sides without indicia and four rectangular indicia bearing sides the indicia on a respective indicia bearing side of an second shape block being different than the indicia on the remaining indicia bearing sides of the same block, said magnets disposed in said second shaped blocks in the opposing sides without indicia, said second shape blocks having first and second orientations wherein the long sides of the first orientation blocks extend vertically and the long sides of the second orientation blocks extend horizontally;
      vi) at least one of said plurality of blocks having musical indicia representing a rest value;
      vii) each of said at least one blocks having musical indicia representing standard rhythmic notes is colored gray;
      viii) each of said at least one blocks having musical indicia representing a rest value is colored white; and ix) at least one of said plurality of blocks having musical indicia representing a time signature;
b) connecting two or more of said music instructional blocks together by said magnets to form musical sequences with rest values where the rest value blocks are identified by the color white and the long sides of at least one first shape block extend vertically and the long sides of at least one second shape block extend horizontally.

9. A method of teaching the rhythmic system of music according to claim 8, wherein:
a) at least one of said plurality of blocks has musical indicia representing an eighth note and its rhythmic equivalent; and
b) at least one of said plurality of blocks has musical indicia representing a sixteenth note and its rhythmic equivalent.

10. A method of teaching the rhythmic system of music according to claim 9, wherein said plurality of blocks having musical indicia representing standard rhythmic notes are sized proportionally to the note represented.

11. A method of teaching the rhythmic system of music according to claim 10, wherein a full set of said plurality of blocks comprises fifty blocks.

* * * * *